3,091,564
INSECTICIDAL COMPOSITIONS

Heinz Frensch, Frankfurt am Main, Maximilian Czech, Hofheim, Taunus, and Ludwig F. Emmel, Bergen-Enkheim, Germany, assignors to Farbwerke Hoechst Aktiengesellschaft vormals Meister Lucius & Brüning, Frankfurt am Main, Germany, a corporation of Germany
No Drawing. Filed June 14, 1960, Ser. No. 35,887
Claims priority, application Germany June 19, 1959
2 Claims. (Cl. 167—30)

The object of the present invention is to provide a means for the control of animal pests, in particular of insects.

From German Patent 963,282 it is known that the 1,2,3,4,7,7 - hexachloro - bicyclo - [2,2,1] - heptene - (2)-bis-(5,6-oxymethylene)-sulfite of the formula

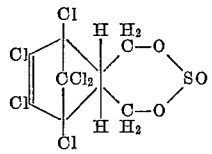

is suitable for controlling animal and fungous pests.

Now, we have found that mixtures consisting of 1,2,3,4,7,7 - hexachloro - bicyclo - [2,2,1] - heptene - (2)-bis-(5,6-oxymethylene)-sulfite and 2,2-bis-(4'-chlorophenyl)-1,1,1-trichlorethane in a proportion of 1:3 to 1:5, exert a synergistic action. The efficacy of this mixture exceeds thus the additive efficacy of the individual components.

The mixtures according to the present invention are very suitable for the control of nuisible insects, for example, various types of beetles, freely feeding caterpillars of the brown tail moth, cantharides, and, above all, for the destruction of plant lice. It is of importance that the mixtures of this invention do not injure useful insects, for example bees.

The mixtures of the active ingredients according to the invention may be applied, particularly in closed rooms, by evaporating.

The mixtures may, however, also be applied in the form of compositions, such as emulsion concentrates, wettable powders, granulates, dusts, aerosols, fumigants or in atomized form.

In order to make up the mixtures of the present invention into emulsion concentrates, they are dissolved in organic solvents, such as acetone, toluene, xylene, methylnaphthalene, etc., and then added with the required quantity of a suitable emulsifier, for example oxethylated nonylphenol, mixtures of non-ionogenic and ionogenic emulsifiers, for example polyglycol ethers of alcohols or phenols, and calcium salts of alkylaryl sulfonates.

Wettable powders of the mixtures of the present invention may be prepared by adding the mixtures with inert carrier substances, such as colloidally precipitated silicic acid or very finely divided silicic acid, bentonite, chalk, etc. as well as with the usual wetting agents.

In order to prepare granulates or dusts of the mixtures of the present invention, a solution or a melt of the active substances is sprayed onto a carrier, for example talcum, or the solid substance is mixed with a carrier substance, and the whole is then ground.

The action or the field of application of the mixtures or formulations of the present invention can be amplified by the addition of insecticides, ovicides, fungicides or fertilizers.

Finally, the mixtures of the present invention may also be made up into fumigants by adding smouldering agents, for example wood flour and potassium nitrate, to these mixtures.

The following example is illustrative of the superior efficacy of the mixtures of the present invention:

EXAMPLE

When plants (*Vicia fabae*) infested with plant lice (*Doralis fabae*) are sprayed with a spraying composition containing the active substances 2,2-bis-(4'-chlorophenyl)-1,1,1-trichlorethane and 1,2,3,4,7,7-hexachloro-bicyclo-[2,2,1]-heptene-(2)-bis-(5,6-oxymethylene)-sulfite at a proportion of 4:1, the plant lice fall from the plants already after a very short time, which is shorter than the period after which they fall from plants which were treated with one and with the other component of the mixture, respectively, at equal proportions of active substance, referred to the content of active substance in the combined spray. This effect is very surprising because, on the one hand, the 2,2-bis-(4'-chlorophenyl)-1,1,1-trichlorethane spray has only an insignificant action on plant lice, and, on the other hand, the initial action of the 1,2,3,4,7,7-hexachloro-bicyclo-[2,2,1]-heptene-(2)-bis-(5,6-oxymethylene)-sulfite is relatively low.

The following table gives average values in percents of three tests with about each time 250–400 test animals. The tabulated data show that the increased initial action of the combination of this invention is not an additive action but a synergistic action of both active substances.

Tests With Doralis fabae (*Initial Action*)

The below listed values are average values obtained in three tests. In this table A represents 1,2,3,4,7,7-hexachlorobicyclo - [2,2,1] - heptene - (2) - bis - (5,6 - oxymethylene)-sulfite, and B 2,2-bis-(4'-chlorophenyl)-1,1,1-trichlorethane.

| Percent Active Substance | | | Fall, after hours, in percent, referred to the total number of plant lice present | | | | | | |
|---|---|---|---|---|---|---|---|---|---|
| A | B | Total | 1 | 2 | 3 | 5 | 6 | 7 | 8 |
| 0.02 | 0.08 | 0.1 | 10.6 | 59.5 | 82.3 | 94.5 | 96.5 | 97.5 | 98.0 |
| 0.01 | 0.04 | 0.05 | 6.6 | 41.2 | 66.6 | 87.0 | 91.6 | 94.8 | 95.6 |
| 0.005 | 0.02 | 0.025 | 5.0 | 25.2 | 46.0 | 73.0 | 79.0 | 85.0 | 88.0 |
| 0.02 | ---- | ------- | 1.5 | 13.3 | 21.8 | 59.5 | 69.5 | 75.3 | 80.5 |
| 0.01 | ---- | ------- | 1.0 | 7.2 | 21.6 | 47.6 | 58.6 | 62.5 | 63.2 |
| 0.005 | ---- | ------- | 0 | 5 | 12.2 | 34.6 | 42.8 | 51.2 | 56.6 |
| ------ | 0.08 | ------- | 1 | 4.6 | 6.6 | 9.5 | 11.5 | 13.0 | 14.5 |
| ------ | 0.04 | ------- | 0.8 | 3.0 | 5.5 | 7.2 | 10.2 | 12.5 | 14.0 |
| ------ | 0.02 | ------- | 0.5 | 2.0 | 3.5 | 5.2 | 6.2 | 7.0 | 7.8 |
| untreated | | | 0.5 | 0.6 | 1.0 | 1.6 | 2.0 | 2.0 | 2.3 |

On the plants treated with B, the following numbers of plant lice were still found 48 hours after spraying:

| Percent Active Substance B | Number of plant lice | |
|---|---|---|
| | Killed | Living |
| 0.08 | 81.6 | 181.6. |
| 0.04 | 54.6 | 203. |
| 0.02 | 49 | 354. |
| Untreated | not counted. | strong infestation. |

We claim:
1. An insecticidal composition, comprising a mixture of one part of 1,2,3,4,7,7-hexachloro-bicyclo-[2,2,1]-heptene-(2)-bis-(5,6-oxymethylene)-sulfite and from three to five parts of 2,2-bis-(4'-chlorophenyl)-1,1,1-trichlorethane as active ingredient.
2. A method of deinfesting plants of plant lice which comprises applying to said plants a composition containing a mixture of one part 1,2,3,4,7,7-hexachlorobicyclo-[2,2,1]-heptene-(2)-bis-5,6-oxymethylene-sulfite and from three to five parts 2,2-bis-(4'-chlorophenyl)-1,1,1,-trichloroethane.

References Cited in the file of this patent

UNITED STATES PATENTS

| | | |
|---|---|---|
| 2,358,942 | Siegler | Sept. 26, 1944 |
| 2,414,193 | Durham | Jan. 14, 1947 |
| 2,771,390 | Williamson et al. | Nov. 20, 1956 |

FOREIGN PATENTS

| | | |
|---|---|---|
| 963,282 | Germany | May 2, 1957 |

OTHER REFERENCES

King: "Chemicals Evaluated as Insecticides," U.S.D.A. Handbook No. 69, May 1954, Entry No. 4199, p. 145.